G. G. HUNT.
SWEEP RAKE.
APPLICATION FILED APR. 12, 1918.

1,354,558.

Patented Oct. 5, 1920.
2 SHEETS—SHEET 1.

Witness:

Inventor:
George G. Hunt,
by Bunton & Bunton
his Attys.

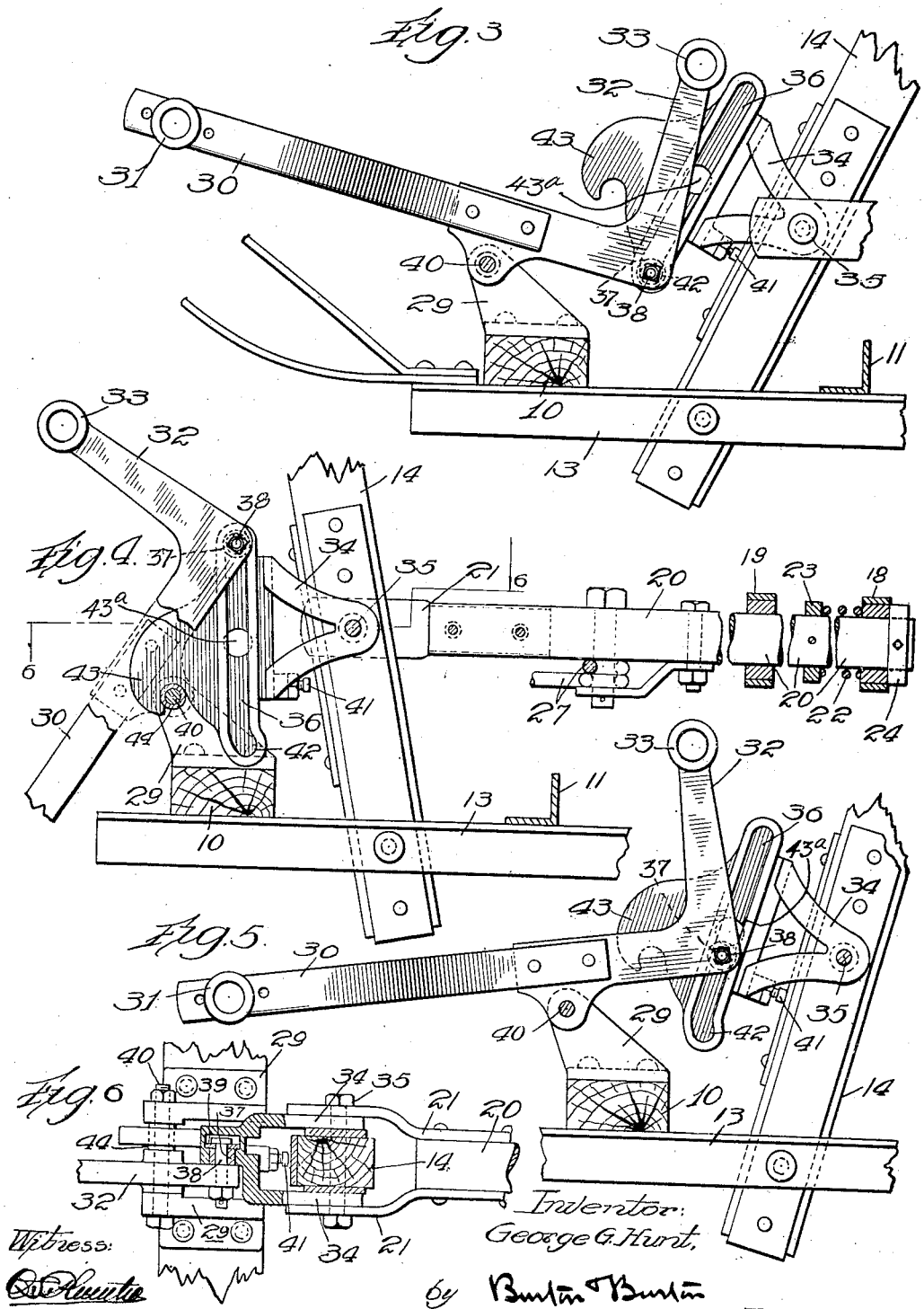

UNITED STATES PATENT OFFICE.

GEORGE G. HUNT, OF PLANO, ILLINOIS, ASSIGNOR TO THE INDEPENDENT HARVESTER COMPANY, OF PLANO, ILLINOIS, A CORPORATION OF ILLINOIS.

SWEEP-RAKE.

1,354,558.     Specification of Letters Patent.     Patented Oct. 5, 1920.

Application filed April 12, 1918. Serial No. 228,107.

*To all whom it may concern:*

Be it known that I, GEORGE G. HUNT, a citizen of the United States, residing at Plano, in the county of Kendall and State of Illinois, have invented certain new and useful Improvements in Sweep-Rakes, of which the following is a specification, reference being had to the accompanying drawings, forming a part thereof.

This invention relates to a sweep rake of the type sometimes called a push rake because the horses travel behind the rake itself in propelling it; and the object of the invention is to provide means for raising and lowering the rake teeth, locking them at either limit of such movement, or holding them at any intermediate position through the agency of a linkage employing the pull of the horses, and counterbalancing springs, and designed to require a minimum of effort on the part of the operator in making the various adjustments. The features of construction by which these results are accomplished are hereinafter described and shown in the drawings, and the extent to which they constitute the invention is indicated by the appended claims.

In the drawings:

Fig. 3 is a side elevation on a much larger scale, showing simply the rake-operating pedal and linkage immediately associated therewith in the position for holding the rake teeth at their lower limit.

Fig. 4 is a side elevation similar to Fig. 3 but showing the parts in position for locking the teeth at their upper limit.

Fig. 5 is also a side elevation of the parts shown in Figs. 3 and 4, but at an intermediate position of adjustment.

Fig. 6 is a detail section taken as indicated at line 6—6 on Fig. 4.

Figure 1:
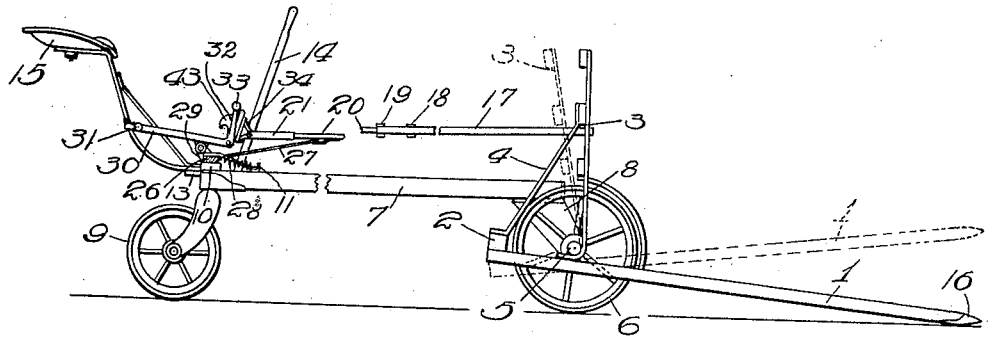
Figure 1 is a side elevation somewhat diagrammatically illustrating a sweep rake embodying this invention.
Figure 2:
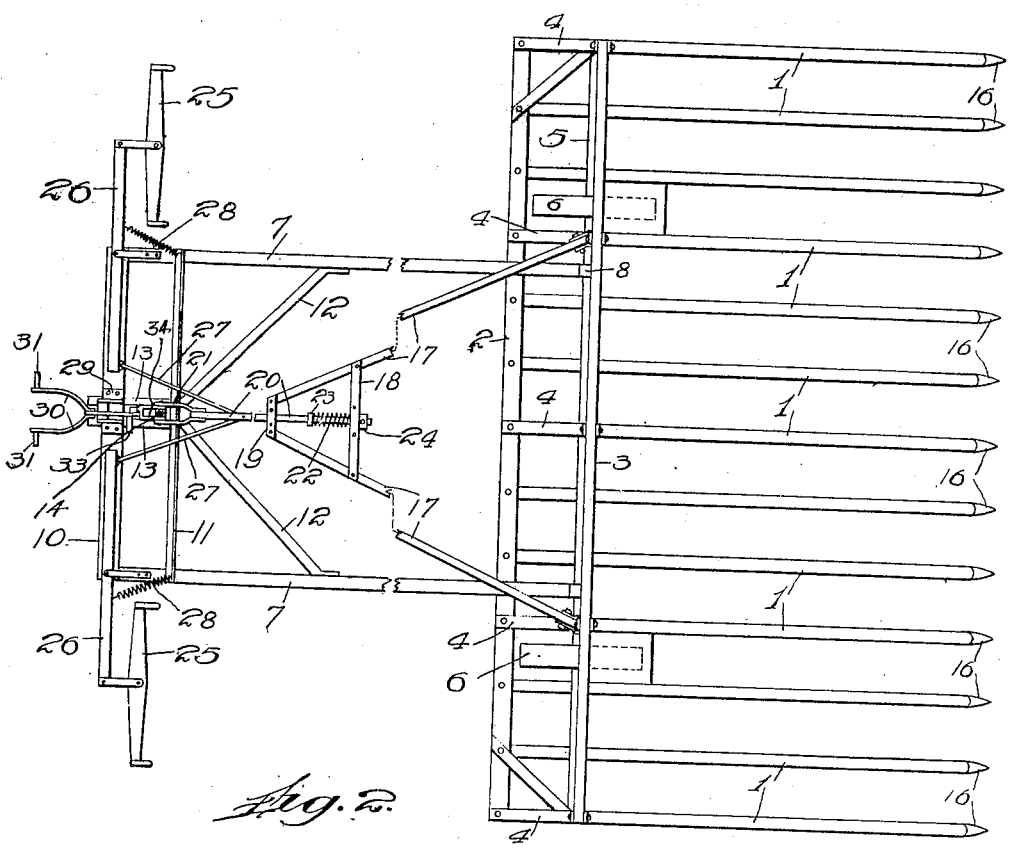
Fig. 2 is a plan view also somewhat diagrammatic, but illustrating the general relation of parts of the rake and its operating mechanism.

The rake illustrated in Figs. 1 and 2 is of the usual construction embodying rake teeth, 1, secured at their rear ends to a cross beam, 2, and an upright guard member, 3, held rigidly in position by braces, 4, and carried on the axle, 5, of wheels, 6. Longitudinal frame members, 7, are supported at their forward ends on brackets, 8, engaging the axle, 5, and at their rear ends by caster wheels, 9, being connected by a cross beam, 10, and supplemental cross bar, 11, with diagonal braces, 12, whose rear end portions, 13, are bent to extend longitudinally of the frame and parallel to each other at a slight distance apart to provide a fulcrum mounting for the hand lever, 14, which constitutes a part of the operating linkage for the rake. A seat for the operator is provided at 15, and the rake adjusting devices are assembled and mounted upon the cross beam, 10, in convenient relation to said seat, 15.

In Fig. 1 the range of adjustment of the rake teeth, 1, is indicated by full line and dotted line positions of said teeth, defining an angle of tilting or rocking about the axle, 5, of the wheel, 6. The teeth are shod with metal tips, 16, which, although sharply pointed, are so rounded toward the point that they will readily ride over ordinary ground without becoming caught or snagged, but upon encountering an unusually large obstacle, it is desirable that the operator be able to raise the teeth off the ground momentarily and this is one object of the present construction.

For connecting the rake with the hand lever, 14, there is provided a reach composed of oblique connecting bars, 17, pivotally attached at their forward ends to the rake head as seen in Fig. 2, and secured together at their rear ends by yoke bars, 18 and 19, in which there is slidably mounted the rod, 20, whose forked rear end, 21, is pivotally connected to the lever, 14. When the parts are adjusted for holding the teeth, 1, down upon the ground the thrust in the rod, 20, is transmitted to the connecting bars through a spring, 22, reacting between the stop collar, 23, on the rod, 20, and the yoke bar, 18. A tension in the rod, 20, for moving the parts to the opposite limit is transmitted to the connecting bar, 17, through a collar, 24, secured at the end of the rod, 20, and also acting against the cross member, 18.

Each of the two horses is hitched to a swingle tree, 25, carried on one end of a lever, 26, which resembles a double tree, and whose opposite end is connected by a link, 27, to the rod, 20, to permit utilizing the pull of the horses for raising the rake teeth to their upper limit when desired. This pull is supplemented by contractile springs, 28, each connected at one end to the cross bar, 11, and at the other end to one of the double tree members, 26, outside the fulcrum thereof, so that the raising of the rake teeth is accomplished by the operator with very little effort on his part. The hand lever, 14, may be used, but by reason of the provision of the specially designed pedal mechanism this lever could be entirely dispensed with except as a guide for the forked end, 21, of the reach member. The treadle device consists of a rock arm or lever fulcrumed on the cross beam, 10, in brackets, 29, and having two rearwardly extending arms, 30, provided with foot treadles, 31, and a single upstanding arm, 32, also fitted with a foot treadle, 33. This lever is connected to the parts comprising the reach and through them with the rake head by means of a special link member formed with a yoke, 34, engaging the same pivot bolt, 35, in lever, 14, by which the forked end, 21, of rod 20 is attached thereto, and formed with a slot, 36, extending in a general vertical direction and therefore transversely of the direction of the pull or thrust in the rod, 20. Pivotal engagement between the treadle lever and the special link member is provided by a roller, 37, carried on a bolt, 38, secured in the lever, said roller engaging the slot, 36, and being retained in position by a flange or washer, 39, in an under-cut portion of the slot, as shown in Fig. 6. The lever, 43, has an aperture, 43ª, for introducing the roller or follower, 38, into the slot, 36. Since the pivot composed of bolt, 38, and roller, 37, will travel in an arc about the fulcrum bolt, 40, of the treadle member, the rocking of this member thus serves to control the position of the lever, 14, and parts of the rake connected thereto.

For locking the rake teeth at their lower limit as shown in full lines in Fig. 1, the roller, 37, is carried to the lower end of slot, 36, by a forward and downward push upon treadle, 33. The slotted link member is stopped against the lever, 14, by engagement of an adjustable stop screw, 41, therewith, but at this lower limit, the pivot roller, 37, is slightly below a line connecting the bolt, 35, and the fulcrum, 40, whereby the treadle lever and slotted link operate as a toggle, and the reactive thrust in rod, 20, will retain the parts so adjusted, though the cushion spring, 22, will permit the teeth, 1, to yield slightly to accommodate themselves to any unevenness of ground. To minimize the frictional resistance to releasing the toggle from this locked position shown in Fig. 3, the lower end of the slot, 36, is offset to extend approximately in the direction of the arc in which the pivot roller, 37, will swing about the fulcrum, 40, such offset formation being shown clearly in Figs. 4 and 5, at 42. Thus a quick pressure on the treadle, 31, will start the roller, 37, up along the offset portion, 42, of slot, 36, past the line connecting the pivot axes at 35 and 40, thus breaking the toggle, and permitting the pull of the horses exerted through the double trees, 26, and links, 27, to raise the rake teeth, 1, to the dotted line position shown in Fig. 1, incidentally carrying the roller, 37, to the upper end of slot, 36, as shown in Fig. 4. The slotted link member is further provided with a hook, 43, which is carried by this latter movement just over a sleeve or enlargement, 44, of the fulcrum bolt, 40, alongside the lever thereon to the position shown in Fig. 4, so that, if the horses stop moving and thus cease their pull upon the double trees, 26, the rake teeth will be retained in elevated position to permit removal of the load in a well understood manner. At this position the slotted link member acts simply as a latch or hook holding back the reach in engagement with the fulcrum bolt, 40, which by its enlargement, 44, constitutes an anchorage for said latch.

To release the hook, 43, a slight forward push on the treadle, 33, starts to swing the roller, 37, away from its position shown in Fig. 4, and in a direction principally forward, and this forward component of its direction operating against the slot, 36, tends to swing the slotted link member upwardly about the pivot bolt, 35, thus first releasing the hook, 43, from the sleeve, 44, on the fulcrum, 40, and permitting the weight of the rake teeth to carry them downwardly if the pull of the horses is not at that moment being exerted in the opposite direction, or permitting the operator by exertion of moderate force upon treadle, 33, to move the roller, 37, downwardly along slot, 36, with a cam action, thus crowding the linkage forwardly for lowering the rake teeth even against the pull of the horses. The rather wide angle of swing of the treadle lever, compared with the resultant forward movement of the linkage, renders only moderate pressure upon the treadle, 33, necessary to overcome all the opposing forces, and for this reason, if at any time it is desired to balance the rake teeth, 1, at any position intermediate of its upper or lower limit the operator can do this readily by placing one foot upon the treadle, 33, and the other foot upon one of the treadles, 31, and thus moving the roller, 37, up or down in the slot, 36, as desired.

I claim:

1. In a sweep rake, the combination of a tiltable rake head, a reach structure extending rearwardly therefrom, an operating lever, a connecting member attached to the reach and having a slot which extends transversely of the line of strain in the reach, and a follower on the lever engaging said slot adapted to travel therein when the lever swings about its fulcrum.

2. In the combination set out in claim 1, the said connecting member being pivotally attached to the reach.

3. In the combination set out in claim 1, said connecting member being attached to the reach by a pivot so located that the point in the length of said slot which is nearest such pivot is intermediate the ends of the slot.

4. In the combination set out in claim 1, said connecting member being pivotally attached to the reach, and a stop for limiting the range of swing of the connecting member on its attaching pivot.

5. In the combination set out in claim 1, a second lever, to which the rear end of the reach is pivotally attached for guidance, the said connecting member being also pivoted to said second lever.

6. In the combination set out in claim 1, a second lever to which the rear end of the reach is pivotally attached for guidance, said lever being provided with a handle to permit of its use in supplementing the operating lever and said connecting member being also pivoted to the second lever.

7. In the combination set out in claim 1, said operating lever being formed for engagement by the operator at two points at opposite sides of its fulcrum to permit holding the said follower at any point in its range of travel in the slot.

8. In the combination set out in claim 1, a frame connected to said rake head and draft rigging on said frame including a lever fulcrumed thereon adapted for attachment of a draft animal and also connected to the reach whereby the draft may be utilized for tilting the rake head and controlled by the shifting of said follower in its slot.

9. In the combination set out in claim 1, said operating lever being formed for engagement by the operator at two points at opposite sides of its fulcrum to permit holding the said follower at any point in its range of travel in the slot, a frame connected to said rake head, and draft rigging on the frame including a lever fulcrumed thereon adapted for attachment of a draft animal and also connected to the reach; whereby the draft may be utilized for tilting the rake head and controlled by the shifting of said follower in its slot; together with additional means for tilting the rake head in a direction to raise the teeth comprising a spring reacting between the frame and the said draft lever fulcrumed thereon.

10. In the combination set out in claim 1, a frame extended rearwardly from said rake head and connected thereto, on which the said operating lever is fulcrumed, a hook pivotally connected to the reach, and anchorage on said frame positioned for engagement of said hook when the rake head is tilted in direction for holding the teeth off the ground.

11. In the combination set out in claim 1, a frame extended rearwardly from said rake head and connected thereto and to which the operating lever is fulcrumed, and a hook integral with the connecting member and thus pivotally connected with the reach, together with an anchorage on said frame positioned for engagement of said hook when the rake head is tilted with the teeth off the ground.

12. In the combination set out in claims 1 and 11, said anchorage being co-axial with the fulcrum of the operating lever.

13. In the combination set out in claim 1, a frame connected to said rake head and a draft lever fulcrumed thereon, adapted for attachment of a draft animal, and also connected to the reach, whereby the draft is utilized for tilting the rake head to raise the teeth, and the end of the slot which engages the pivot on the operating lever when the rake teeth are lowered thereby, being slightly off the line from the lever fulcrum to the pivot by which the slotted member is attached to the reach, whereby the operating lever and said slotted member constitute a toggle for locking the rake teeth down against the force of the draft.

In testimony whereof, I have hereunto set my hand at Plano, Illinois, this 9th day of April, 1918.

GEORGE G. HUNT.